(12) United States Patent
Goodman et al.

(10) Patent No.: US 12,155,642 B2
(45) Date of Patent: Nov. 26, 2024

(54) USER ATTESTATION IN DISTRIBUTED CONTROL PLANE

(71) Applicant: Dell Products L.P., Round Rock, TX (US)

(72) Inventors: Bradley K. Goodman, Nashua, NH (US); Kirk Alan Hutchinson, Londonderry, NH (US)

(73) Assignee: Dell Products L.P., Round Rock, TX (US)

( * ) Notice: Subject to any disclaimer, the term of this patent is extended or adjusted under 35 U.S.C. 154(b) by 286 days.

(21) Appl. No.: 17/725,291

(22) Filed: Apr. 20, 2022

(65) Prior Publication Data

US 2023/0344817 A1    Oct. 26, 2023

(51) Int. Cl.
*H04L 9/40* (2022.01)
*H04L 9/08* (2006.01)
*H04L 9/14* (2006.01)
*H04L 9/32* (2006.01)

(52) U.S. Cl.
CPC ........ *H04L 63/0815* (2013.01); *H04L 9/0825* (2013.01); *H04L 9/14* (2013.01); *H04L 9/3263* (2013.01); *H04L 9/40* (2022.05); *H04L 63/0823* (2013.01); *H04L 63/102* (2013.01); *H04L 63/20* (2013.01)

(58) Field of Classification Search
CPC . H04L 63/0823; H04L 63/0815; H04L 63/08; H04L 63/00; H04L 9/0825; H04L 9/0819; H04L 9/08; H04L 9/006; H04L 9/007; H04L 9/14; H04L 63/10; H04L 63/102; H04L 63/20; H04L 9/3263; H04L 9/40; H04L 9/3247; G06F 21/31; G06F 21/30; G06F 21/33; G06F 21/10; G06F 2221/2141; G06F 2221/2149; G06F 2221/2145; H04W 12/06; H04W 12/069; H04W 12/00; H04W 12/084
See application file for complete search history.

(56) References Cited

U.S. PATENT DOCUMENTS

| | | | |
|---|---|---|---|
| 2017/0279806 A1* | 9/2017 | Marttinen | H04L 63/10 |
| 2018/0041484 A1* | 2/2018 | Gifford | H04L 9/3247 |
| 2020/0186357 A1* | 6/2020 | Laitinen | H04L 9/0643 |
| 2023/0016837 A1* | 1/2023 | Gamishev | H04L 63/102 |
| 2024/0193250 A1* | 6/2024 | Chen | G06F 21/44 |

FOREIGN PATENT DOCUMENTS

| | | | | |
|---|---|---|---|---|
| JP | 2005277951 A | * | 10/2005 | |
| WO | WO-2021195219 A1 | * | 9/2021 | H04L 63/0272 |

* cited by examiner

*Primary Examiner* — Ali S Abyaneh
*Assistant Examiner* — Brandon Binczak
(74) *Attorney, Agent, or Firm* — Womble Bond Dickinson (US) LLP

(57) ABSTRACT

Methods and systems for managing the security of distributed systems that utilize certificates for command and control purposes are disclosed. The certificates may be used to delegate authority to various entities and attest public keys associated with the entities. To manage security using the certificates, the system may limit use of certificates and public keys to only those that have been attested. By doing so, the vulnerability to attacks through unauthorized use of keys of delegates may be reduced.

20 Claims, 9 Drawing Sheets

USER ATTESTATION IN DISTRIBUTED CONTROL PLANE

FIELD OF THE DISCLOSED EMBODIMENTS

Embodiments disclosed herein relate generally to certificate management. More particularly, embodiments disclosed herein relate to systems and methods for certificate management for authority delegation in distributed systems.

BACKGROUND

Computing devices may store data and used stored data. For example, computing devices may utilize data when providing computer implemented services. Different computing devices may perform similar and/or different functions. To operate as a distributed system, all or a portions of the computing devices may need to be able to ascertain the authorities granted to various entities.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
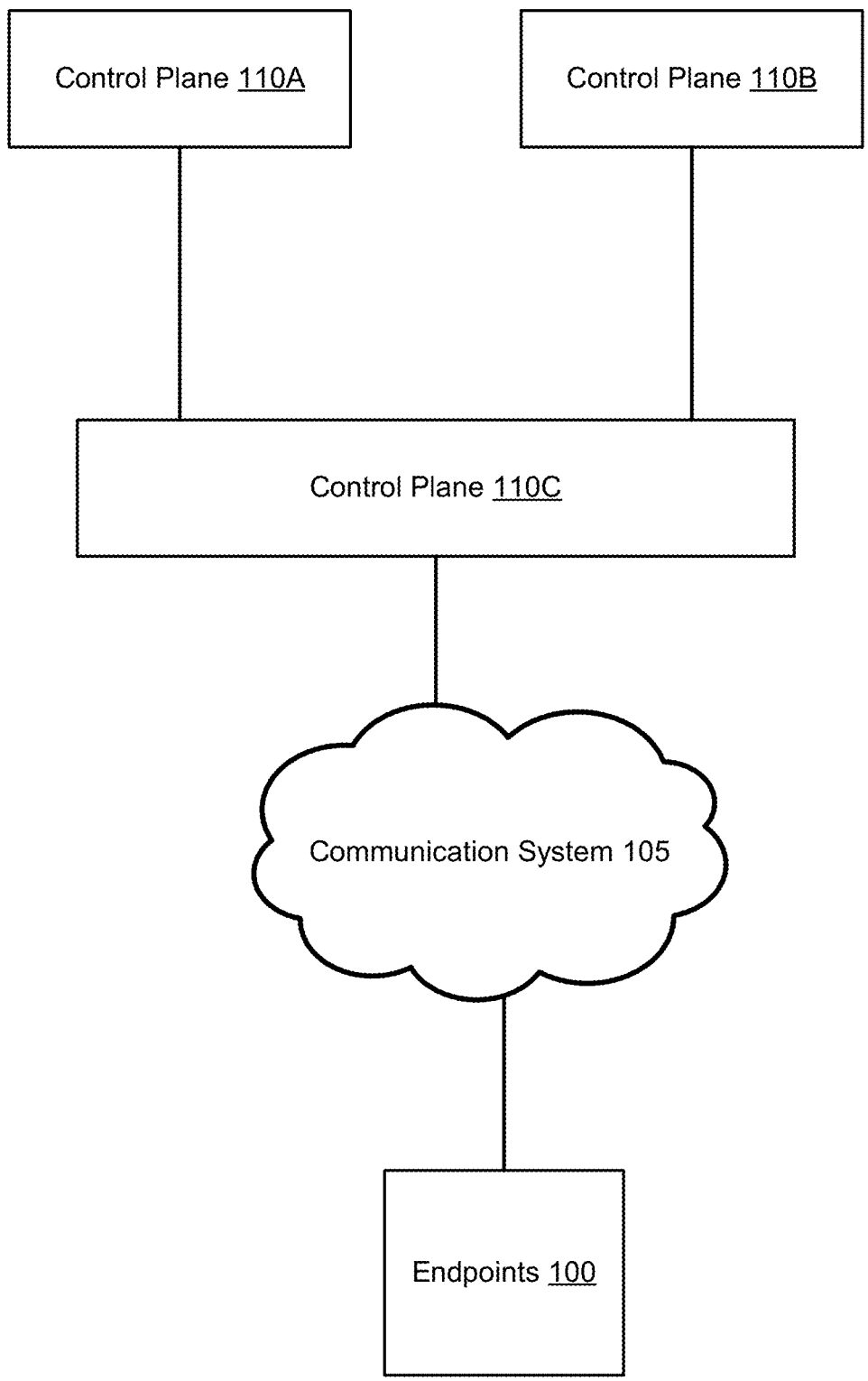
FIG. 1A shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the security of distributed systems that utilize certificates for command and control purposes. The certificates may be used to delegate authority to various entities and attest public keys associated with the entities. An attested public key may be one for which a corresponding entity meets certain identification and/or key management practice requirements. The key management practices may include, for example, where keys may need to be stored, when and how they may be disclosed, how they may be generated or used, and/or may include other, additional, and/or fewer requirements.

To manage security using the certificates, the system may limit use of certificates and public keys (at least for delegation purposes) to only those that have been attested. For example, when a certificate is used to delegate authority to delegates via a chain of delegations, the delegated authority may only be treated as having been delegated if all of the public keys associated with the delegates have been attested. Likewise, only public keys that have been attested into key management authorities.

By doing so, the vulnerability to attacks through unauthorized use of keys of delegates may be reduced by ensuring that the keys of the delegates are managed in accordance with particular key management practices. The public keys of delegates that do not manage keys in accordance with the key management practices may be treated as insecure, and authority alleged to be delegated to these delegates may not actually be delegated by the command and control system of the distributed system.

In an embodiment, a computer-implemented method for managing security in a distributed system using certificates is provided. The method may include obtaining, by an endpoint, an operation request; identifying one or more keys used to authorize the operation request, the one or more keys being public keys of delegates to establish that an operation indicated by the operation request is authorized; making a determination, based on an attestation policy, that all of the one or more keys are attested; and based on the determination: performing an action set to service the operation request.

The attestation policy may require that a command authority (e.g., a particular delegator that has authority that a delegate lacks) for the operation attest the public keys.

The command authority may be an entity that has permission to authorize the operation request, and the delegates may not have permission to authorize the operation request.

The attestation policy may require that an entity that is both a non-delegate and a non-command authority for the operation attest the public keys.

The command authority may be a second entity that has permission to authorize the operation request, and the delegates may not have permission to authorize the operation request.

The attestation policy may require that all of the one or more keys be attested in a single certificate.

Making the determination may include obtaining one or more attestation certificates, the attestation certificates being signed by trusted entities, and the attestation certificates indicate that the one or more keys are vetted.

The vetted key may have been verified as being in the possession of a corresponding entity.

The possession of the vetted key may be verified through single sign on domain login verification.

A vetted key may have been verified as being maintained in accordance with a globally enforced key management practice.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may facilitate performance of workloads (e.g., computer-implemented workloads performed by executing computing instructions with at least one processor of one or more data processing systems). The system may include, but is not limited to endpoints 100.

Endpoints 100 may provide the computer implemented services (in isolation or cooperation with other data processing system not illustrated in FIG. 1A). For example, endpoints 100 may independently and/or cooperatively (e.g., with other devices) provide any number and type of computer implemented services.

For example, endpoints 100 may provide computer implemented services to users and/or other computing devices operably connected to endpoints 100. The computer implemented services may include any type and quantity of services including, for example, database services, instant messaging services, video conferencing services, etc. Different systems may provide similar and/or different computer implemented services.

Due to the distributed nature of the system illustrated in FIG. 1A, the components of FIG. 1A may implement processes for (i) command and control (e.g., determining whether to follow a request, action, instruction, etc.), (ii) communications verification, and/or (iii) other purposes to manage coordination within the distributed system. To do so, the components of FIG. 1A may utilize certificates. The certificates may be signed using keys (e.g., keys of a public-private key pair) to allow other entities to verify that the content of the certificate is from (or endorsed by) a particular entity.

In an embodiment, the certificates are utilized to delegate authority within the distributed system. For example, the distributed system may implement a permissions system tied to various entities. A certificate may be used to delegate authority by (i) indicating to which entity a particular authority is being delegated, (ii) include a public key for the delegate, and (iii) be signed using the private key of the delegator. When an order for work (or other operation limited by permissions) is initiated by a delegate, a control plane (e.g., 110A-110C) may compare the scope of the work to the permission granted for both the delegate and the delegator to ascertain whether the work should be performed or denied. In this manner, authority in the system of FIG. 1A may be dynamically granted at any level of granularity.

However, delegating authority in this manner may present certain risks. For example, if the delegate's private key is compromised, then other entities may use the delegate's private key to use the authority of the delegator in an unauthorized manner.

Figure 1B:
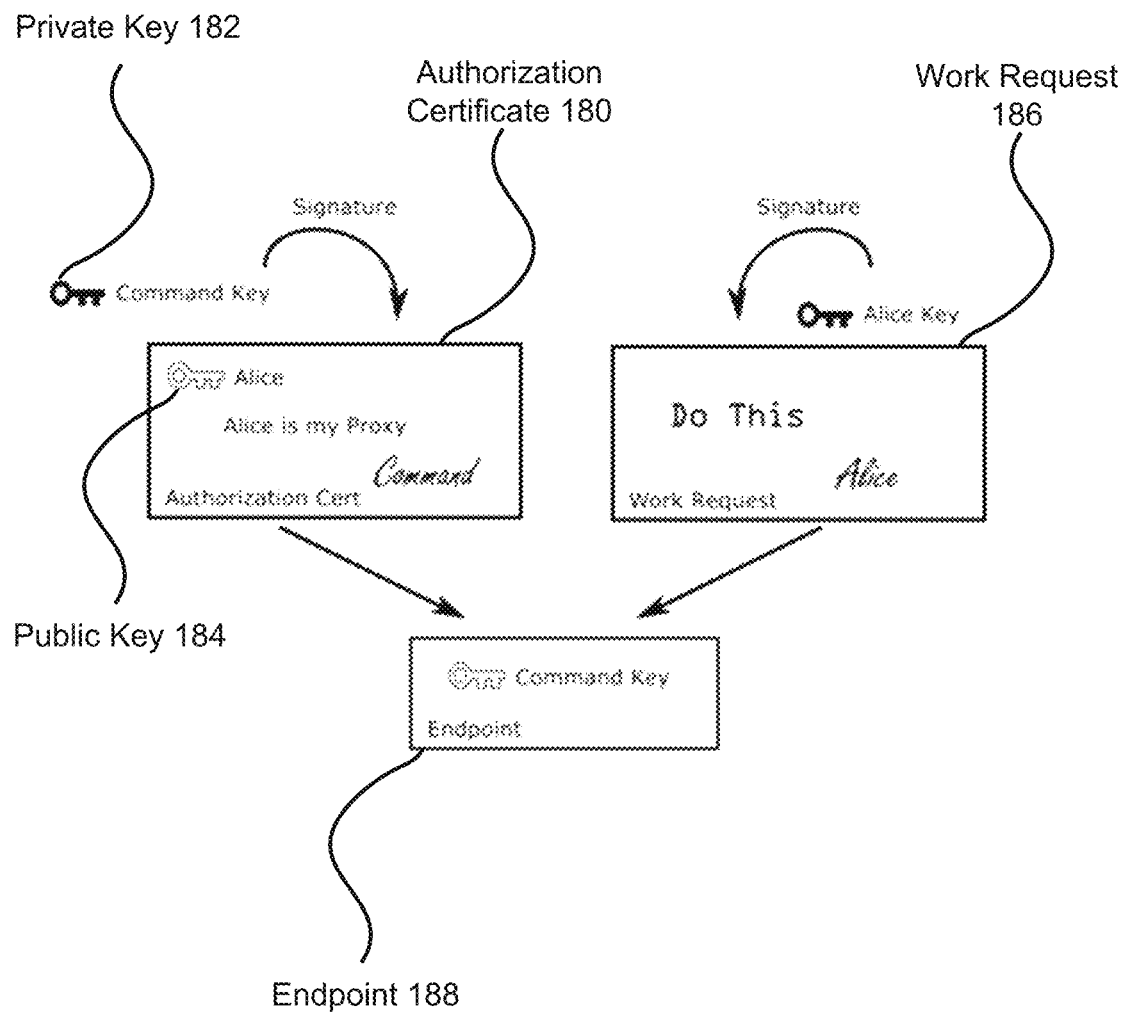
FIG. 1B shows a diagram illustrating an authority delegation in accordance with an embodiment.

For example, turning to FIG. 1B which shows a diagram in accordance with an embodiment, consider a scenario in which a command authority wishes to allow user Alice to authorize certain work requests. The command authority may do so, for example, by generating authorization certificate 180. Authorization certificate 180 may include a copy of a public key 184 associated with Alice, instructions to allow Alice to authorize work requests (e.g., "Alice is my Proxy"), and may be signed using the command authority's private key (e.g., 182). Consequently, work request 186 signed with Alice's private key may be carried out by endpoint 188 so long as the command authority has permission to do so and endpoint 188 has access to all of these certificates/work orders. However, in this example scenario, if another entity has access to Alice's private key, any number of work requests may be generated and carried out by endpoint 188.

Returning to the discussion of FIG. 1A, in general, embodiments disclosed herein relate to systems, methods, and devices for managing operation of a distributed system (e.g., like the system shown in FIG. 1) through use of certificates. To manage the distributed system, the system of FIG. 1 may implement an attestation process and attestation verification process. The attestation and attestation verification processes may reduce the likelihood of delegated authority being a vector for attack on the command and control of the system.

The attestation process may include vetting keys and generating attestation certificates for vetted keys. The vetting process may include (i) verifying that a key is in possession of a corresponding person, and (ii) verifying that the key was generated, is being stored, and/or is being used only in accordance with a set of key management practices. The attestation certificates may be generated by signing a copy of a key associated with the person for which the key has been successfully vetted.

To verify that the key is in possession of the corresponding person, manual processes such as manual, physical presence and identity verification checks by a human (e.g., an identification check) may be performed, or automated processes may be performed such as a single sign on domain login check.

To verify that the keys are being managed in a manner consistent with the key management practices, various processes may be performed such as verifying how a key was generated and stored, for example, and/or by which software or hardware entity the key was generated. The key management practices verification process may also include verification through a trusted entity cryptographically attesting that it was the generator of this key. In an embodiment, the verification process is performed through automated querying of a Trusted Platform Module (TPM) in a computer that generated the key. The TPM may export a cryptographic certificate attesting that it has generated the key, and which may be signed by a publicly verifiable key.

Once a key has been verified, an attestation certificate for the key may be generated and stored for future use, and/or distributed to other entities. For example, the distributed control plane 110A-110C may host a certificate management authority in which various types of certificates (e.g., authorization, attestation, etc.) are stored. Endpoints 100, control planes 110A-110C, and/or other devices may utilize these certificate to ascertain authorities delegated to various entities. The certificate management authority may be implemented, for example, as a distributed database or application that manages certificates. The certificate management authority may store and provide certificates to various entities.

To facilitate key management, the system of FIG. 1A may include a distributed control plane (e.g., 110A-110C). The distributed control plane may include one or more key management authorities that may manage any number of public keys for any number of entities that may have certain permission enforced by the distributed control plane and/or endpoints 100.

To reduce the likelihood of compromised keys being used to attack the command and control used to manage the system of FIG. 1A, any of the key management authorities may screen keys on the basis of whether they have been attested by a trusted entity. The trusted entities may be managed through policies implemented by the distributed control plane and/or endpoints 100. These policies may require that only keys (e.g., public keys) that have been attested by certain entities, or their delegates, be imported. By doing so, keys that may have been compromised (or are more likely to have been compromised) may be screened on the basis of importation into the key management authorities.

To further reduce the likelihood of keys being used as an attack vector, the system of FIG. 1A may restrict delegation through certificates on the basis of the attestation status of the keys associated with the entity to which authority may be delegated.

Figure 1C:
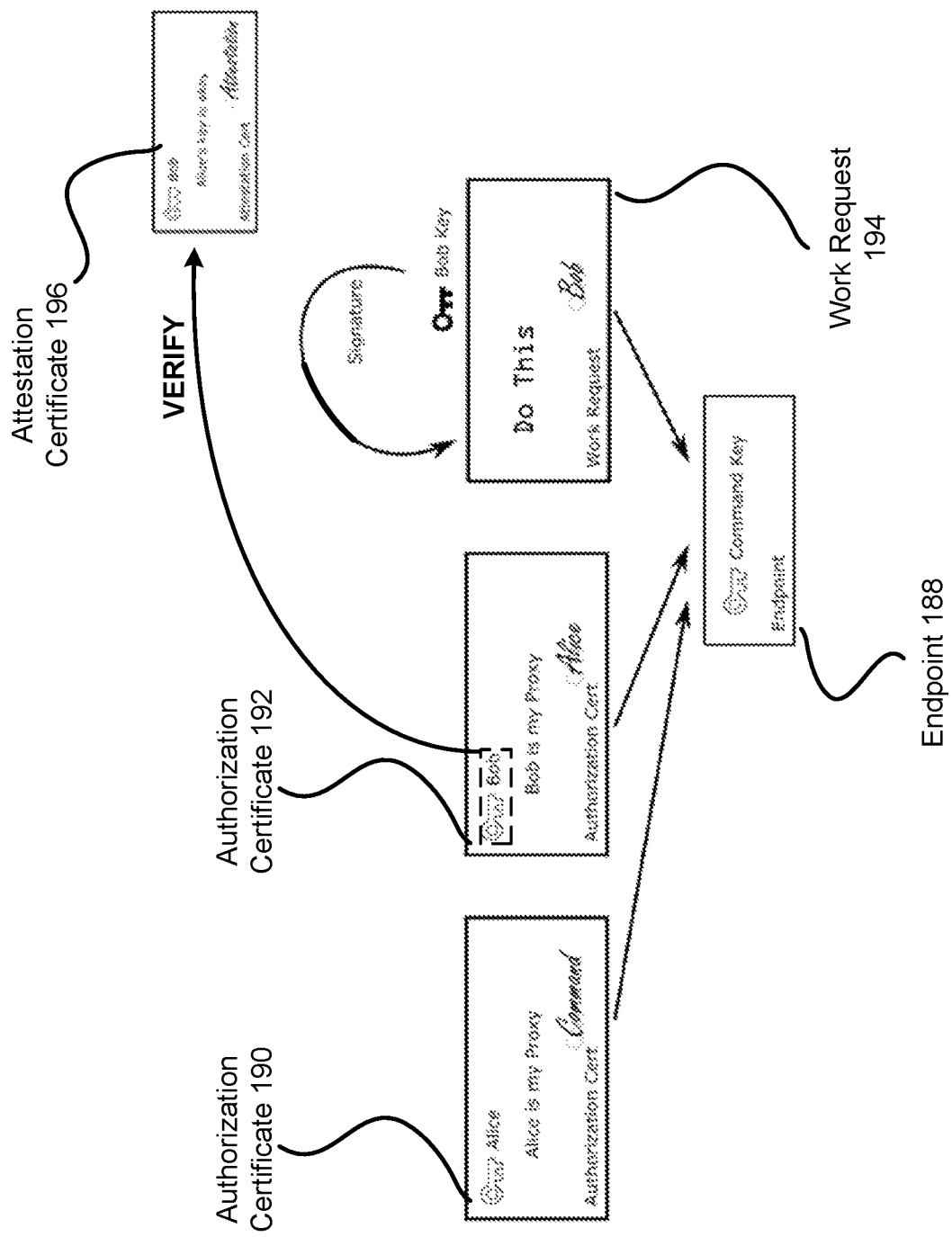
FIG. 1C shows a diagram illustrating a verified authority delegation in accordance with an embodiment.

For example, turning to FIG. 1C which shows a diagram in accordance with an embodiment, consider a scenario in which a command authority wishes to allow user Alice to authorize certain work requests, and user Alice wishes to authorize user Bob to authorize the same work requests. The command authority may do so, for example, by generating authorization certificate 190, and Alice may generate authorization certificate 192.

However, prior to generating authorization certificate 192, a check may be performed to ensure that Bob's public key has been attested. To do so, the system may determine whether attestation certificate 196 exists in a key management authority, on an endpoint, or elsewhere. If attestation certificate 196 exists, then authorization certificate 192 may be generated which may allow work request 194, signed by Bob, to be implemented by endpoint 188. For example, endpoint 188 may determine that the command authority delegated its authority for the work order to Alice and Alice, by virtue of the existence of authorization certificate 192, delegated authority to Bob for the work order. Consequently, endpoint 188 may determine that Bob has permission to authorize work request 194.

Returning to the discussion of FIG. 1A, the check performed prior to allowing an authorization certificate may be policy enforced. The policies may require that, for example, public keys for individuals to which authority will be delegated by a certificate be attested to by certain entities (e.g., attestors). The policies may specify that the attestors be certain entities (e.g., persons or computer implemented), may require certain degrees of attestation, may require that the attestations be made during certain periods of time (e.g., not stale), etc.

The use of certificates may also be subject to policies. For example, some of the policies may require that, when endpoints 100 and/or the distributed control plane (e.g., 110A-11C) are evaluating whether a particular individual has sufficient permission to perform certain actions within the system, all or a portion of the public keys included in certificates be attested to by one or more entities.

Figure 1D:
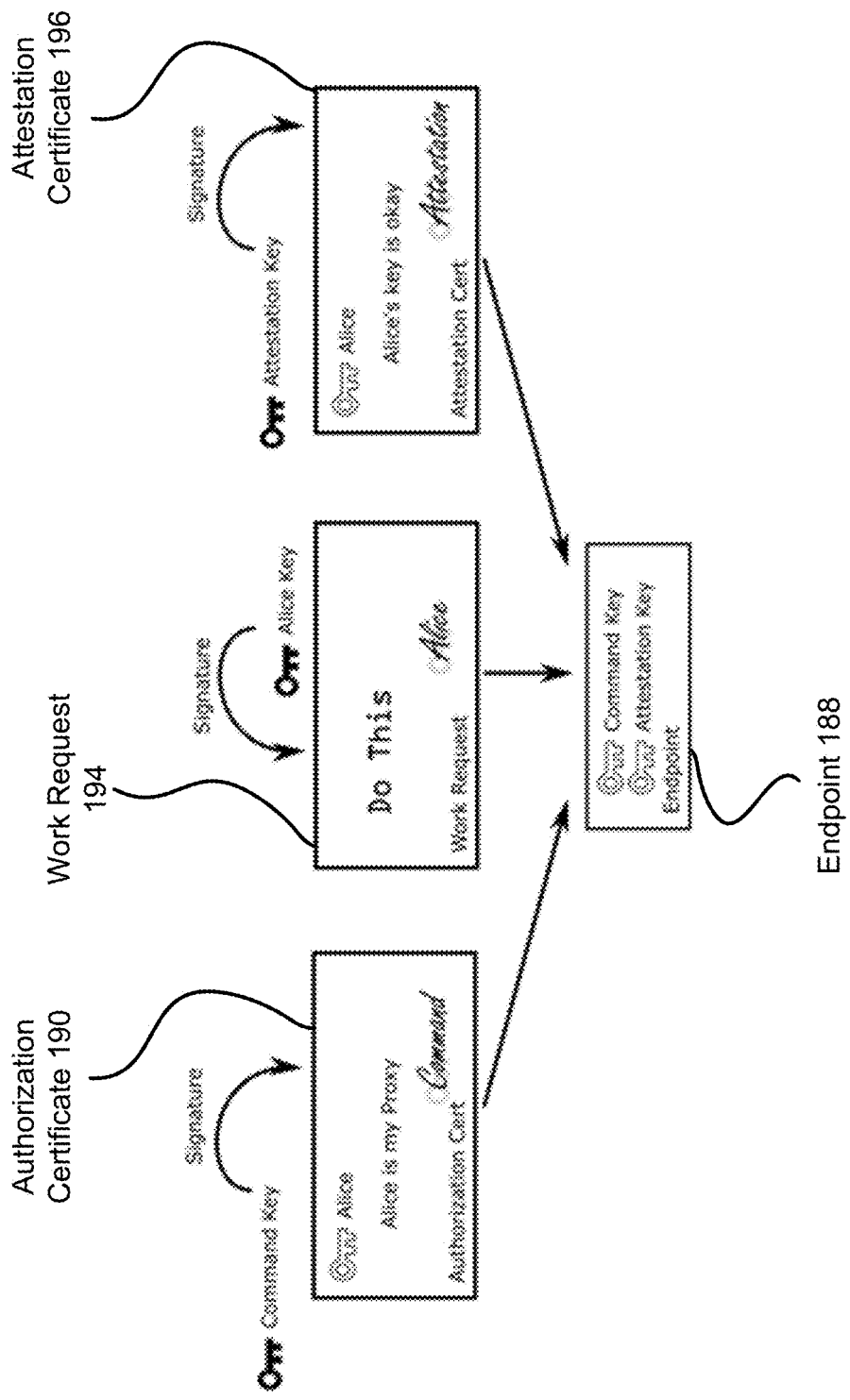
FIG. 1D shows a diagram illustrating a delegation supported by attestation in accordance with an embodiment.

For example, turning to FIG. 1D which shows a diagram in accordance with an embodiment, consider a scenario in which a command authority wishes to allow user Alice to authorize certain work requests. To do so, the command authority may generate authorization certificate 190. While authorization certificate 190 may give Alice the authority to authorize work to endpoint 188, endpoint 188 may be subject to a policy that requires a higher level of verification for such authorization certificates.

The policy may require, for example, that endpoint 188 verify that a trusted attestor have attested Alice before treating authorization certificate 190 as valid (e.g., for delegation purposes). The attestor may perform the checks as discussed above and, if passed, generate attestation certificate 196. Attestation certificate 196 may include a copy of Alice's public key, indicate that Alice's key is acceptable, and include a signature that endpoint 188 may use to verify with the attestor's public key that attestation certificate 196 was generated with the attestor's private key. Consequently, with the command authority's and attestor's public key, endpoint 188 may verify whether the command authority's authority has been appropriately delegated to Alice (e.g., meets the policy requirements), or not.

Returning to the discussion of FIG. 1A, endpoints 100 may enforce a broad range of policies that limit usage of certificates at endpoints including, for example, (i) policies that require any keys included in authorization certificates be attested, (ii) policies that require any keys included in authorization certificates be attested by specific entities, and (iii) policies that require any keys included in authorization be attested to in a single (or limited number) of certificates. In contrast to (i) and (ii) which may allow for compliance with any number of certificates, (iii) may require that all of the attestations be included in a single certificate.

Figure 1E:
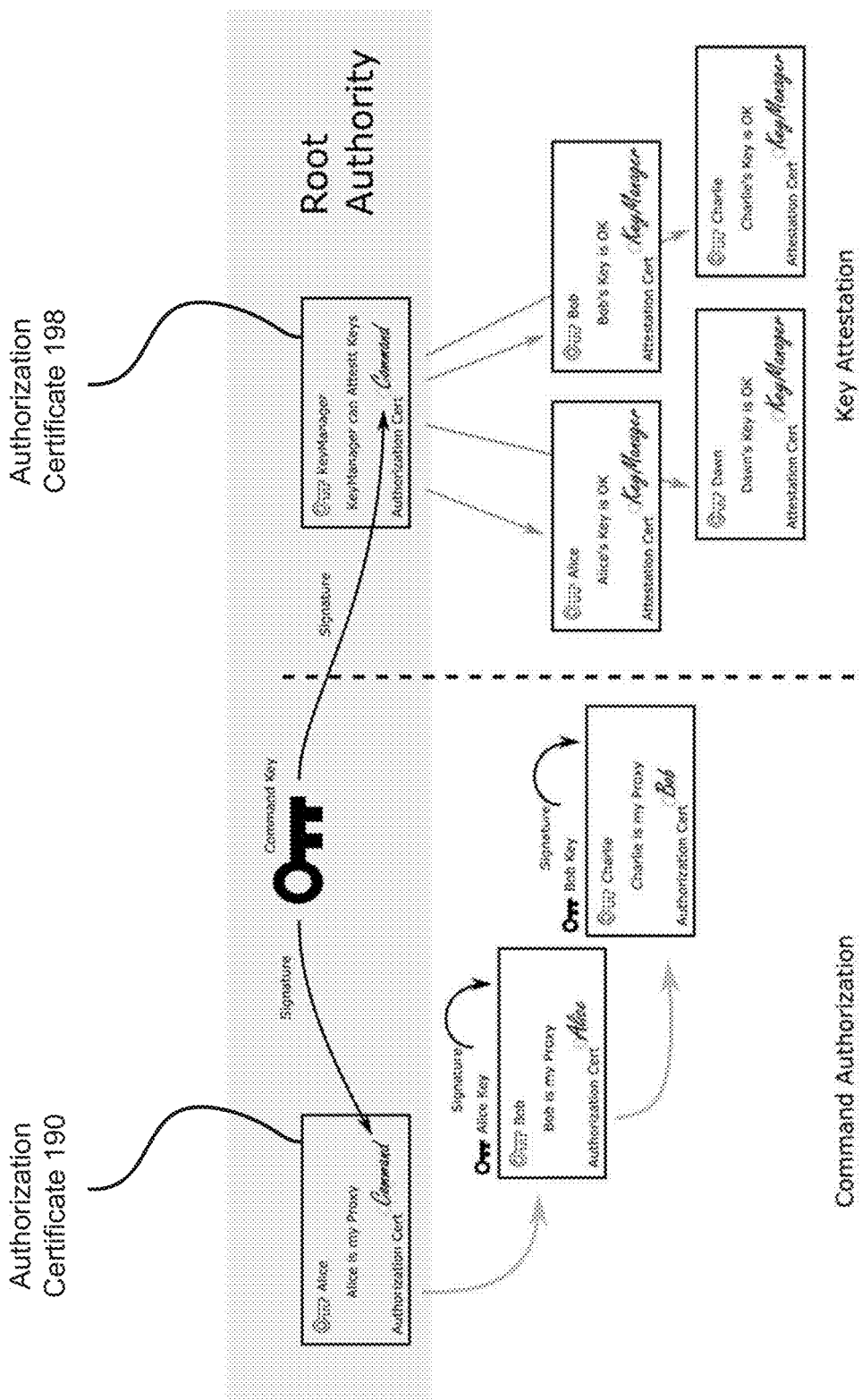
FIG. 1E shows a diagram illustrating a delegation of both authority and attestation in accordance with an embodiment.

For example, turning to FIG. 1E which shows a diagram in accordance with an embodiment, consider a scenario in which a command authority wishes to delegate command authority to Alice and attestation authority to a key manager (e.g., a key management authority). To do so, the command authority may generate authorization certificate 190 to delegate authority to Alice, who may in turn delegate authority to Bob and Charlie through other certificates. Similarly, the command authority may generate authorization certificate 198 to delegate attestation authority to the key manager, who may in turn attest any number of public keys include those of Alice, Bob, Charlie, Dawn, and/or others.

When a work order from Charlie is received by an endpoint, the endpoint may search for attestations of all of the public keys necessary for the command authority to delegate to Charlie in a single certificate. If such a certificate does not exist, then the work order may be treated as being issued by an entity that does not have permission to do so.

Returning to the discussion of FIG. 1A, through these policies, restrictions on delegation may be enforced at a granular level, and/or via a central or distributed authority. For example, the policies may specify (i) which entities need to have attested certain keys for the certificates that incorporate these keys to be used for delegation, (ii) under what conditions certificates will be treated as delegating authority, and/or (iii) which permission from an authority may or may not require attestation. Through these limitations, the policies may be fine grained to facilitate different levels of restriction to mitigate different levels of risk. For example, delegation of certain authorities that are relatively low risk may not require any attestation for delegation while delegation of high risk authorities may require significant, specific attestations for the authority to be delegated.

By doing so, embodiments disclosed herein may provide a distributed system that is less susceptible to attacks due to authority delegation and poor key hygiene. Accordingly, the disclosed system may have a higher up time and may be more resilient.

Any of endpoints 100 and the distributed control plane (e.g., 110A-110C) may be implemented using a data processing system (e.g., a computing device) such as a host or server, a personal computer (e.g., desktops, laptops, and tablets), a "thin" client, a personal digital assistant (PDA), a Web enabled appliance, a system on a chip, an embedded computing device, a mobile phone (e.g., Smartphone), or any other type of data processing device or system. For additional details regarding data processing systems, refer to FIG. 5.

Any of endpoints 100 and the distributed control plane may be implemented with multiple computing devices. The computing device may form a distributed system operably connected via one or more networks. The computing devices may manage their operation using a command and control scheme which may utilize certificate and/or public-private key pairs.

The functionality of the distributed control plane may be performed, in part, as a shared service (e.g., distributed application). For example, the shared service may include agents hosted by various computing devices of the distributed control plane and/or endpoints 100.

Figure 2A:
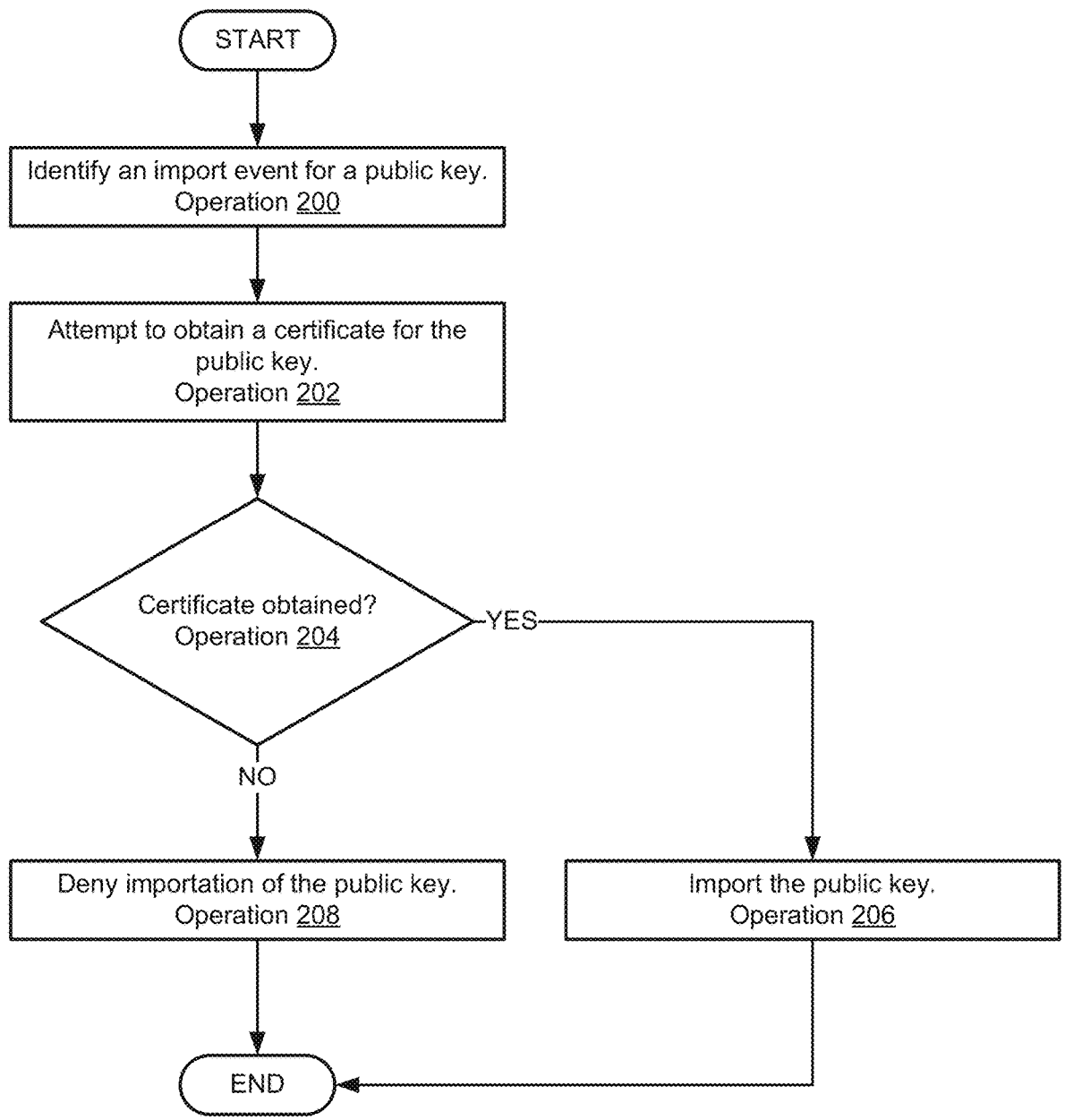
FIG. 2A shows a flow diagram illustrating a method of importing a public key in accordance with an embodiment.
Figure 2B:
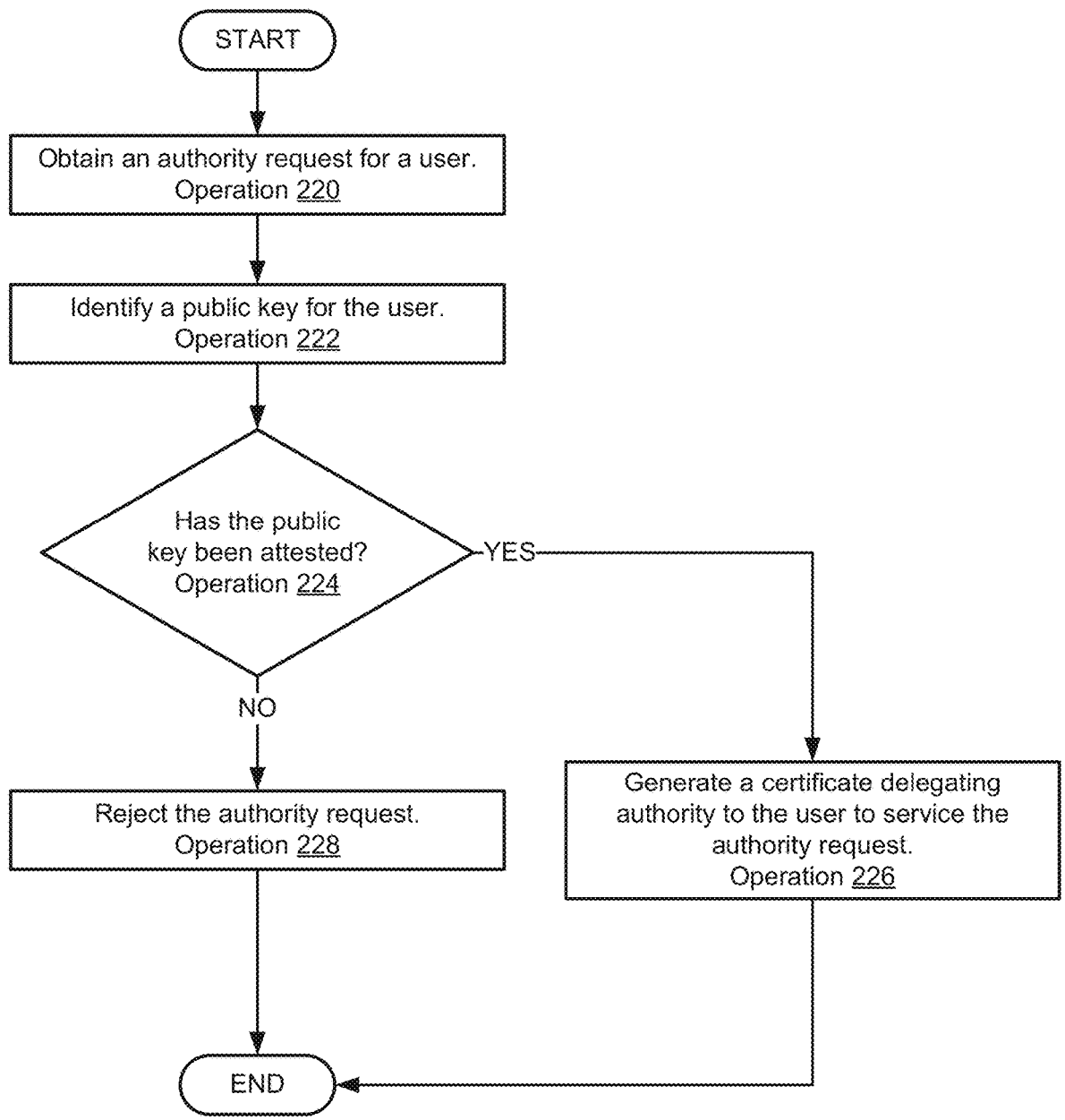
FIG. 2B shows a flow diagram illustrating a method of delegating authority in accordance with an embodiment.
Figure 2C:
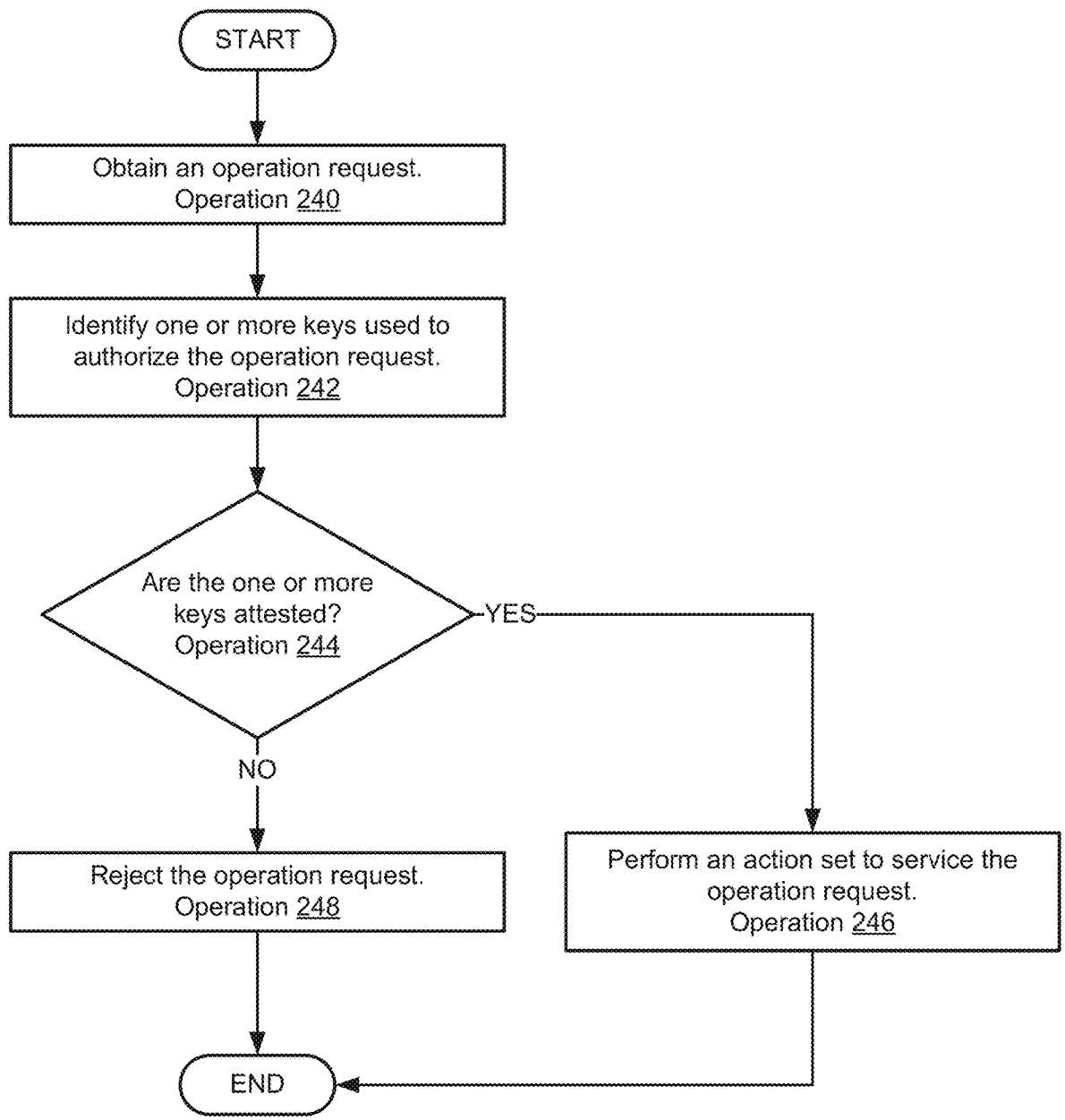
FIG. 2C shows a flow diagram illustrating a method of servicing an operation request in accordance with an embodiment.

Endpoints 100 and/or control plane 110A-110C may perform all, or a portion, of the methods illustrated in FIGS. 2A-2C.

Any of the components illustrated in FIG. 1A may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

Any of control planes 110A-110C may be operably connected to one another and/or other entities through any combination of wired and/or wireless network.

While illustrated in FIG. 1A as including a limited number of specific components, a system in accordance with an embodiment may include fewer, additional, and/or different components than those illustrated therein.

As discussed above, the components of FIG. 1A may perform various methods to manage certificates. FIGS. 2A-2C illustrates examples of methods that may be performed by the components of FIG. 1A when providing their functionalities. In the diagrams discussed below and shown in these figures, any of the operations may be repeated, performed in different orders, and/or performed in a parallel with other operations and/or a partially overlapping in time manner with other operations.

Turning to FIG. 2A, a flow diagram illustrating a method of managing receipt of a public key in accordance with an embodiment is shown. The method may be performed by a key management authority of a distributed control plane. The key management authority may manage public keys of any number of entities. The public keys may be used, for example, to verify whether data structures have been signed using corresponding private keys.

At operation 200, an import event for a public key is identified. The import even may be, for example, an entity (e.g., endpoint, control plane portion, etc.) providing a copy of a public key to a key management authority.

At operation 202, a certificate for the public key is attempted to be obtained. The certificate may be an attestation certificate. The attestation certificate may be subject to a policy based restriction requiring that it be signed with a private key associated with a trusted entity.

In an embodiment, the certificate is attempted to be obtained by requesting it from a key management authority. For example, the key management authority may send a request for any attestation certificate for the public key signed by the trusted entity (if such a restriction is in place) to the certificate management authority. If such a certificate exists, the certificate management authority may provide it to the key management authority.

At operation 204, it is determined whether the certificate of operation 202 is obtained. If the certificate is obtained, then the method may proceed to operation 206. Otherwise the method may proceed to operation 28.

At operation 206, the public key is imported. The key may be imported by storing a copy of it and/or storing metadata regarding the public key usable to inform other entities of the existence of the public key and/or the corresponding attestation certificate.

The method may end following operation 206.

Returning to operation 204, the method may proceed to operation 208 following operation 204 if the certificate is not obtained.

At operation 208, importation of the public key is denied. Importation of the public key may be denied by discarding the public key. Metadata regarding the public key may also be stored to inform other entities that a valid public key (e.g., associated with an entity) is not available.

The method may end following operation 208.

Using the method illustrated in FIG. 2A, embodiments disclosed herein may reduce the likelihood of public keys associated with compromised entities being distributed. By doing so, the threat of attack via key theft and attacks on the command and control system of the system of FIG. 1 via such thefts may be reduced.

Turning to FIG. 2B, a flow diagram illustrating a method of managing authority delegation in accordance with an embodiment is shown. The method may be performed by an endpoint and/or a distributed control plane.

At operation 220, an authority request for a user is obtained. The authority request may request permission for delegation of authority of a first entity to the user (e.g., a person or a device). The authority request may be obtained, for example, from a delegator or a delegate. For example, a user of an endpoint may generate and send a request for an authorization certificate to delegate certain permissions from one entity to another entity.

At operation 222, a public key for the user is identified. The public key may be identified, for example, based on the content of the authority request (e.g., may include the public key) or may be obtained from a key management authority (e.g., based on an identity of the user).

At operation 224, it is determined whether the public key has been attested. The determination may be made based on a policy. The policy may specify which entities may attest the public key. A lookup by the certificate management authority may be performed for the public key and the entities specified by the policy. If an attestation certificate by one of the entities and for the public key is available, then it may be determined that the public key has been attested.

If it is determined that the public key has been attested, then the method may proceed to operation 226. Otherwise the method may proceed to operation 228.

At operation 228, a certificate delegating authority to the user is generated to service the authority request. The certificate may be generated by the delegator with the delegator's private key. The certificate may be an authorization certificate which authorities of the delegator have been delegated to the user. The certificate may be stored with the certificate management authority.

The method may end following operation 226.

Returning to operation 224, the method may proceed to operation 228 following operation 224 when it is determined that the public key has not been attested.

At operation 228, the authority request is rejected. A certificate delegating authority to the user may not be generated. The authority request may be discarded.

The method may end following operation 228.

Using the method illustrated in FIG. 2B, embodiments disclosed herein may reduce the likelihood of delegated authorities being used to attack the command and control system implemented by the system of FIG. 1. By doing so, the threat of attack via key theft may be reduced.

Turning to FIG. 2C, a flow diagram illustrating a method of managing permissions in accordance with an embodiment is shown. The method may be performed by an endpoint.

At operation 240, an operation request is obtained. The operation request may be obtained from a user of the endpoint, from another endpoint, from the distributed control plane, or from another entity. The operation request may request performance of one or more actions. The request may come from an identifiable entity.

At operation 242, one or more keys used to authorize the operation request are identified. The keys may be identified by identifying one or more authorization certificates that grant the entity authority to cause the one or more actions to be performed. Any number of authorization certificates may be identified to establish an authorization certificate chain between the entity (e.g., that lacks permissions) and an entity in the chain that has delegated their permissions for the one or more actions to the entity.

Each of the authorization certificates in the certificate chain may include a public key (or information usable to identify a public key). The one or more keys may be the public keys identified by the certificates in the certificate chain. For example, the keys may be the public keys of the delegates between the delegator that has permission to initiate the one or more actions and the entity to which the authority is delegated via the certificate chain.

At operation 244, it is determined whether the one or more keys are attested. The determination may be made based on a policy. The policy may specify which entities may attest the keys and/or the form of the certificate (e.g., multiple or a unified certificate). A lookup by the certificate management authority may be performed for the keys and the limitations specified by the policy. If an attestation certificate for the keys and that meets the requirements of the policy is available, then it may be determined that the keys has been attested.

If the keys have been attested, then the method may proceed to operation 246. Otherwise the method may proceed to operation 248.

At operation 246, an action set to service the operation request is performed. The action set may include any number and types of actions to complete the operation request. The action set may include action that the requestor, in isolation, does not have permission to initiate. However, the certificate chain may grant the requestor with such permission, so long as the certificates in the chain include attested public keys.

The method may end following operation 246.

Returning to operation 244, the method may proceed to operation 248 following operation 244 when it is determined that the one or more keys are not attested.

At operation 248, the operation request is rejected. The operation request may be rejected by discarding it without perform actions to complete it. Thus, the operation request may go unfulfilled.

The method may end following operation 248.

Using the method illustrated in FIG. 2C, embodiments disclosed herein may reduce the likelihood of delegated authorities being used to attack the command and control system implemented by the system of FIG. 1 through verification of attestation of public keys used in authorization certificate chains that delegate permission. By doing so, the threat of attack via key theft may be reduced.

The embodiments disclosed in FIGS. 1A-2C may improve the security of a distributed environment. The disclosed system and methods facilitate: (i) security of the identification of an individual (and/or an individual's public cryptographic key) for the purposes of assuring that any permissions bestowed upon that key will only be conveyed to the proper intended individual, (ii) prevention of theft or compromise of a key by permitting management of keys and therefore of key management policies, themselves, (iii) distribution of only public keys which have been vetted for use, (iv) distribution of only public keys generated and managed via certain methods or practices that meet certain security practices (e.g., key management policies), (v) mandatory key handling practices, and/or (vi) granular key management practices for adapted to varying operations.

Figure 3:
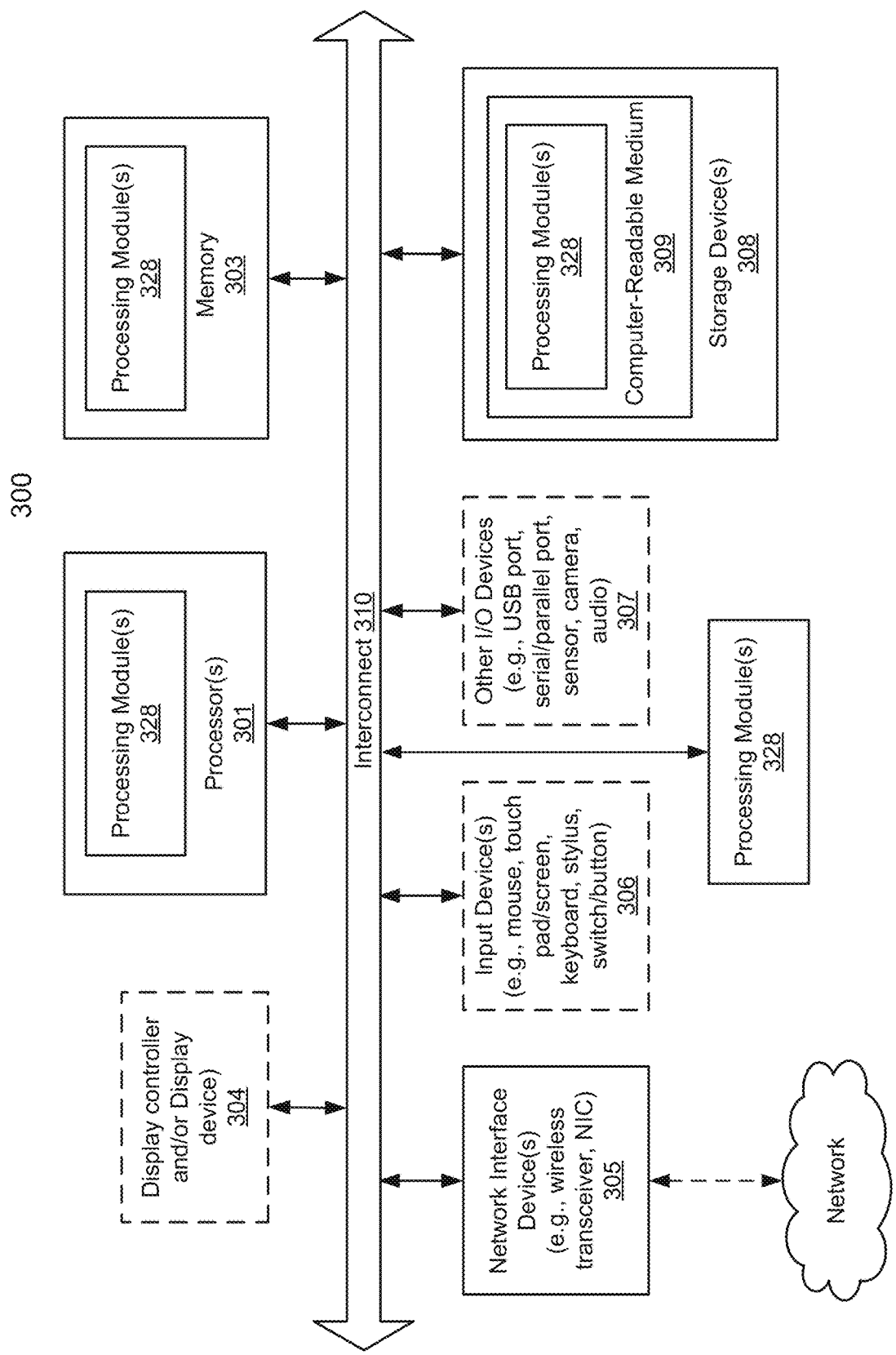
FIG. 3 shows a block diagram illustrating a data processing system in accordance with an embodiment.

Any of the components illustrated in FIGS. 1-2C may be implemented with one or more computing devices. Turning to FIG. 3, a block diagram illustrating an example of a data processing system (e.g., a computing device) in accordance with an embodiment is shown. For example, system 300 may represent any of data processing systems described above performing any of the processes or methods described above. System 300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 300 is intended to show a high level view of many components of the computer system. However, it is to be understood that additional components may be present in certain implementations and furthermore, different arrangement of the components shown may occur in other implementations. System 300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 300 includes processor 301, memory 303, and devices 305-308 via a bus or an interconnect 310. Processor 301 may represent a single processor or multiple processors with a single processor core or multiple processor cores included therein. Processor 301 may represent one or more general-purpose processors such as a microprocessor, a central processing unit (CPU), or the like.

More particularly, processor 301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 301, which may be a low power multi-core processor socket such as an ultra-low voltage processor, may act as a main processing unit and central hub for communication with the various components of the system. Such processor can be implemented as a system on chip (SoC). Processor 301 is configured to execute instructions for performing the operations discussed herein. System 300 may further include a graphics interface that communicates with optional graphics subsystem 304, which may include a display controller, a graphics processor, and/or a display device.

Processor 301 may communicate with memory 303, which in one embodiment can be implemented via multiple memory devices to provide for a given amount of system memory. Memory 303 may include one or more volatile storage (or memory) devices such as random access memory (RAM), dynamic RAM (DRAM), synchronous DRAM (SDRAM), static RAM (SRAM), or other types of storage devices. Memory 303 may store information including sequences of instructions that are executed by processor 301, or any other device. For example, executable code and/or data of a variety of operating systems, device drivers, firmware (e.g., input output basic system or BIOS), and/or applications can be loaded in memory 303 and executed by processor 301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 300 may further include IO devices such as devices (e.g., 305, 306, 307, 308) including network interface device(s) 305, optional input device(s) 306, and other optional IO device(s) 307. Network interface device(s) 305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 306 may include a mouse, a touch pad, a touch sensitive screen (which may be integrated with a display device of optional graphics subsystem 304), a pointer device such as a stylus, and/or a keyboard (e.g., physical keyboard or a virtual keyboard displayed as part of a touch sensitive screen). For example, input device(s) 306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 307 may include an audio device. An audio device may include a speaker and/or a microphone to facilitate voice-enabled functions, such as voice recognition, voice replication, digital recording, and/or telephony functions. Other IO devices 307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 310 via a sensor hub (not shown), while other devices such as a keyboard or thermal sensor may be controlled by an embedded controller (not shown), dependent upon the specific configuration or design of system 300.

To provide for persistent storage of information such as data, applications, one or more operating systems and so forth, a mass storage (not shown) may also couple to processor 301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 301, e.g., via a serial peripheral interface (SPI). This flash device may provide for non-volatile storage of system software, including a basic input/output software (BIOS) as well as other firmware of the system.

Storage device 308 may include computer-readable storage medium 309 (also known as a machine-readable storage medium or a computer-readable medium) on which is stored one or more sets of instructions or software (e.g., processing module, unit, and/or processing module/unit/logic 328) embodying any one or more of the methodologies or functions described herein. Processing module/unit/logic 328 may represent any of the components described above. Processing module/unit/logic 328 may also reside, completely or at least partially, within memory 303 and/or within processor 301 during execution thereof by system 300, memory 303 and processor 301 also constituting machine-accessible storage media. Processing module/unit/logic 328 may further be transmitted or received over a network via network interface device(s) 305.

Computer-readable storage medium 309 may also be used to store some software functionalities described above persistently. While computer-readable storage medium 309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 328, components and other features described herein can be implemented as discrete hardware components or integrated in the functionality of hardware components such as ASICS, FPGAs, DSPs or similar devices. In addition, processing module/unit/logic 328 can be implemented as firmware or functional circuitry within hardware devices. Further, processing module/unit/logic 328 can be implemented in any combination hardware devices and software components.

Note that while system 300 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing security in a distributed system using certificates, the method comprising:
   obtaining, by an endpoint, an operation request requesting that an action set be performed by the endpoint, the operation request being signed using a private key of a first entity that lacks permission to authorize the operation request, the first entity being a requestor of the operation request;
   verifying, by the endpoint, whether the endpoint can perform the action set to service the operation request by:
      identifying, by the endpoint and within a separate computing device in the distributed system, a key for validating the operation request, the key being a public key of the first entity;
      making a first determination, by the endpoint, that the public key of the first entity identified by the endpoint is included in an authorization certificate stored in the separate computing device, the authorization certificate being signed by a command entity with permission to authorize the operation request and conveys the permission from the command entity to the first entity; and
      making a second determination, after the first determination and by the endpoint based on an attestation policy, that the public key of the first entity is attested in an attestation certificate indicating the first entity as being trusted by a key attestation entity specified in the attestation policy, the key attestation entity being different from the command entity, and the attestation certificate is also stored in the separate computing device, is used to validate the authorization certificate, and is signed using a private key of the key attestation entity; and
   based on the second determination that the public key of the first entity is attested:
      receiving permission from the separate computing device to import the public key of the first entity;
      importing the public key of the first entity from the separate computing device; and
      performing, by the endpoint and after validating the operation request using the public key of the first entity imported from the separate computing device, the action set to service the operation request, the action set being different from the verifying performed by the endpoint.

2. The computer-implemented method of claim 1, wherein the attestation policy requires that the key attestation entity signing the attestation certificate also be an entity with permission to authorize the operation request.

3. The computer-implemented method of claim 1, wherein the attestation certificate is generated by the key attestation entity and further indicates that the public key of the first entity is a vetted key that is vetted by the key attestation entity as being in a possession of the first entity.

4. The computer-implemented method of claim 3, wherein the public key of the first entity is vetted as being in the possession of the first entity using single sign on domain login verification.

5. The computer-implemented method of claim 1, wherein the attestation certificate is generated by the key attestation entity and further indicates that the public key of the first entity is a vetted key that is vetted by the key attestation entity as being maintained in accordance with a globally enforced key management practice.

6. The computer-implemented method of claim 1, wherein the authorization certificate is signed using a private key of the second entity.

7. The computer-implemented method of claim 1, wherein, during the verifying by the endpoint, copies of the authorization certificate and the attestation certificate are not retrieved by the endpoint to the endpoint.

8. A non-transitory machine-readable medium having instructions stored therein, which when executed by a processor, cause the processor to perform operations for managing security in a distributed system using certificates, the operations comprising:
   obtaining, by an endpoint, an operation request requesting that an action set be performed by the endpoint, the operation request being signed using a private key of a first entity that lacks permission to authorize the operation request, the first entity being a requestor of the operation request;
   verifying, by the endpoint, whether the endpoint can perform the action set to service the operation request by:
      identifying, by the endpoint and within a separate computing device in the distributed system, a key for validating the operation request, the key being a public key of the first entity;
      making a first determination, by the endpoint, that the public key of the first entity identified by the endpoint is included in an authorization certificate stored in the separate computing device, the authorization certificate being signed by a command entity with permission to authorize the operation request and conveys the permission from the command entity to the first entity; and
      making a second determination, after the first determination and by the endpoint based on an attestation policy, that the public key of the first entity is attested in an attestation certificate indicating the first entity as being trusted by a key attestation entity specified in the attestation policy, the key attestation entity being different from the command entity, and the attestation certificate is also stored in the separate computing device, is used to validate the authorization certificate, and is signed using a private key of the key attestation entity; and
   based on the second determination that the public key of the first entity is attested:
      receiving permission from the separate computing device to import the public key of the first entity;
      importing the public key of the first entity from the separate computing device; and
      performing, by the endpoint and after validating the operation request using the public key of the first entity imported from the separate computing device, the action set to service the operation request, the action set being different from the verifying performed by the endpoint.

9. The non-transitory machine-readable medium of claim 8, wherein the attestation policy requires that the key attestation entity signing the attestation certificate also be an entity with permission to authorize the operation request.

10. The non-transitory machine-readable medium of claim 8, wherein the authorization certificate is signed using a private key of the second entity.

11. The non-transitory machine-readable medium of claim 8, wherein the attestation certificate is generated by the key attestation entity and further indicates that the public key of the first entity is a vetted key that is vetted by the key attestation entity as being in a possession of the first entity.

12. The non-transitory machine-readable medium of claim 11, wherein the public key of the first entity is vetted as being in the possession of the first entity using single sign on domain login verification.

13. The non-transitory machine-readable medium of claim 8, wherein the attestation certificate is generated by the key attestation entity and further indicates that the public key of the first entity is a vetted key that is vetted by the key attestation entity as being maintained in accordance with a globally enforced key management practice.

14. The non-transitory machine-readable medium of claim 8, wherein, during the verifying by the endpoint, copies of the authorization certificate and the attestation certificate are not retrieved by the endpoint to the endpoint.

15. An endpoint, comprising:
   a processor; and
   a memory coupled to the processor to store instructions, which when executed by the processor, cause the processor of the endpoint to perform operations for managing security in a distributed system using certificates, the operations comprising:
      obtaining an operation request, the operation request requesting that an action set be performed by the endpoint, the operation request being signed using a private key of a first entity that lacks permission to initiate performance of the action set to authorize the operation request, the first entity being a requestor of the operation request;
      verifying whether the endpoint can perform the action set to service the operation request by:
         identifying, within a separate computing device in the distributed system, a key for validating the operation request, the key being a public key of the first entity; and
         making a first determination, by the endpoint, that the public key of the first entity identified by the endpoint is included in an authorization certificate stored in the separate computing device, the authorization certificate being signed by a command entity with permission to authorize the operation request and conveys the permission from the command entity to the first entity; and
         making a second determination, after the first determination and based on an attestation policy, that the public key of the first entity is attested in an attestation certificate indicating the first entity as being trusted by a key attestation entity specified in the attestation policy, the key attestation entity being different from the command entity, and the attestation certificate is also stored in the separate computing device, is used to validate the authorization certificate, and is signed using a private key of the key attestation entity; and based on the second determination that the public key of the first entity is attested:
  receiving permission from the separate computing device to import the public key of the first entity;
  importing the public key of the first entity from the separate computing device; and
  performing, by the endpoint and after validating the operation request using the public key of the first entity imported from the separate computing device, the action set to service the operation request, the action set being different from the verifying performed by the endpoint.

16. The endpoint of claim 15, wherein the attestation policy requires that the key attestation entity signing the attestation certificate also be an entity with permission to authorize the operation request.

17. The endpoint of claim 15, wherein the authorization certificate is signed using a private key of the second entity.

18. The endpoint of claim 15, wherein the attestation certificate is generated by the key attestation entity and further indicates that the public key of the first entity is a vetted key that is vetted by the key attestation entity as being in a possession of the first entity.

19. The endpoint of claim 18, wherein the public key of the first entity is vetted as being in the possession of the first entity using single sign on domain login verification.

20. The endpoint of claim 15, wherein the attestation certificate is generated by the key attestation entity and further indicates that the public key of the first entity is a vetted key that is vetted by the key attestation entity as being maintained in accordance with a globally enforced key management practice.

* * * * *